United States Patent [19]
LeClair et al.

[11] Patent Number: 5,876,641
[45] Date of Patent: Mar. 2, 1999

[54] IN-LINE PROCESS FOR INJECTION OF FOAM MATERIAL INTO A COMPOSITE PROFILE

[75] Inventors: Jeffry A. LeClair, Eagan, Minn.; Duane T. Fier, Hudson, Wis.; Joseph G. Reithmeyer, Afton, Minn.

[73] Assignee: Andersen Corporation, Bayport, Minn.

[21] Appl. No.: 729,144

[22] Filed: Oct. 11, 1996

Related U.S. Application Data

[63] Continuation-in-part of Ser. No. 509,159, Jul. 31, 1995, abandoned.

[51] Int. Cl.$^6$ .............................. B29C 44/06; B29C 44/12
[52] U.S. Cl. .......................... 264/46.6; 264/46.4; 264/135
[58] Field of Search ........................... 156/180; 264/46.6, 264/46.4, 46.9, 257, 135

[56] References Cited

U.S. PATENT DOCUMENTS

| | | | |
|---|---|---|---|
| 3,246,058 | 4/1966 | Voelker | 264/47 |
| 3,331,173 | 7/1967 | Elsner | 52/309 |
| 3,331,174 | 7/1967 | Wesch et al. | 52/309 |
| 4,643,857 | 2/1987 | Cousin et al. | 264/46.6 |
| 4,795,666 | 1/1989 | Okada et al. | 428/71 |
| 4,828,897 | 5/1989 | Staneluis et al. | 428/71 |
| 4,863,771 | 9/1989 | Freeman | 428/36.1 |
| 4,939,037 | 7/1990 | Zion et al. | 428/36.3 |
| 4,983,453 | 1/1991 | Beall | 428/294 |
| 5,092,950 | 3/1992 | Spoo et al. | 156/180 |
| 5,094,055 | 3/1992 | Berdan | 52/397 |
| 5,120,380 | 6/1992 | Strachan | 156/164 |
| 5,248,467 | 9/1993 | Cushman | 264/102 |
| 5,286,320 | 2/1994 | McGrath et al. | 156/83 |
| 5,513,477 | 5/1996 | Farber | 52/723.1 |
| 5,529,731 | 6/1996 | Bendick et al. | 264/45.5 |
| 5,653,923 | 8/1997 | Spoo et al. | 264/46.1 |

OTHER PUBLICATIONS

*MMGF Special Report*, pp. 1–6, 1982.
*The Pultrusion Seminar*, PTI, A Division of MMFG, pp. B1–B5B; B30–B49; C1–C66; D1–D9;E1–E3; F1–F36; G2–G11; H1–H41; I1–I34; J1–J30, 1989.
*Pultruded Composites from Concept to Reality*, The Society of the Plastics Industry, Inc., pp. 1–7/(undated).
*PTI –A Division of MMFG*, Company Profile, pp. 1–14, 1995.
*Extren Fiberglass Structural Shapes and Plate*, MMFG, pp. 1–11. (undated).

*Primary Examiner*—Allan R. Kuhns
*Attorney, Agent, or Firm*—Merchant, Gould, Smith, Edell, Weltr & Schmidt, P.a.

[57] ABSTRACT

A method for forming a composite profile having a foam material introduced therein. The invention provides an inline method for the introduction of a foam material into a composite profile.

13 Claims, 5 Drawing Sheets

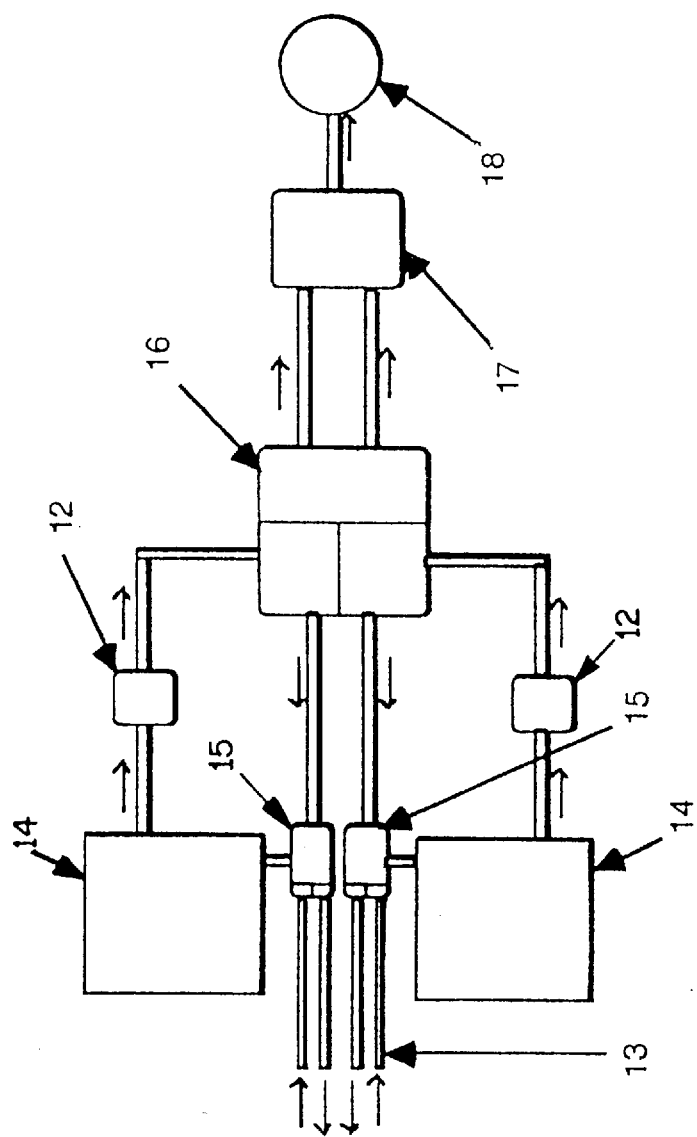

IN-LINE PROCESS FOR INJECTION OF FOAM MATERIAL INTO A COMPOSITE PROFILE

This application is a Continuation-In-Part of U.S. Ser. No. 08/509,159, filed Jul. 31, 1995, now abandoned, entitled "IN-LINE PROCESS FOR INJECTION OF FOAM MATERIAL INTO A COMPOSITE PROFILE AND ARTICLE MADE FROM SAME".

FIELD OF THE INVENTION

This invention is directed to a process for injection of a foam material into a composite profile.

BACKGROUND OF THE INVENTION

One method used to manufacture composite or reinforced plastic articles is the pultrusion process. In a fairly simple form, pultrusion is a process in which continuous glass fibers or other reinforcing materials are coated or saturated with a plastic material and then pulled through a die to form an article having a desired cross-sectional profile. The reinforcing material within the article provides strength, durability, and other desirable properties. See, for example, *Modern Plastics Encyclopedia*, "Pultrusion and Pulforming" (1986).

Pultrusion may be used to prepare articles having nearly any desired cross section. Due to the versatility of the process, pultrusion may be used to prepare a wide variety of structural materials, such as building panels, window lineals, ladder rails, and so on.

While many of the pultruded profiles are hollow because of cost, weight, and processing considerations, for certain applications a composite profile surrounding a filled core is desired. A pultruded profile filled with foam, for example, has superior insulating and structural properties. A pultruded composite with a foam core will have improved resistance to temperature change because the foam will provide increased resistance to the transfer of heat.

Further, a foam core will allow pultruded forms to be joined or have articles secured thereto in the same manner as a more homogeneous material such as wood, due to the good fastener retention capability of structural foams. This fastener retention capability will also provide the ability to fasten parts along the lineal portion of the pultruded profile.

A number of attempts have been made in the prior art to provide a pultruded article with a structural foam core. Staneluis et al., U.S. Pat. No. 4,828,897, describe a method for preparing a reinforced composite having an outer polymeric skin and an inner polymeric foam core bonded together by means of strands of high modulus material. In this process the pressure of the expanding foam material forces the polymeric skin into the mold, thereby forming the proper shape.

McGrath et al., U.S. Pat. No. 5,286,320, teaches the preparation of a pultruded panel by arranging reinforcing fibers on a preformed foam core, applying liquid resin to the reinforcements, and passing the materials through a pultrusion die. Process heat allows the resin to flow and permeate the reinforcements, thereby causing the resin to penetrate both the reinforcements and the core.

In U.S. Pat. No. 5,120,380, an in-line cored pultruded profile is prepared by placing core-forming materials into a pre-die former that is larger than the pultrusion die. As the core-forming material passes through the pre-die former, it progressively conforms to the cross-sectional shape of the die as it approaches the die station.

All of the known methods for forming a foam filled pultruded profile require multiple processing steps, in the pre-forming of a foam core, or added steps to bond the core and the shell, or curing steps.

Accordingly, a need exists for a method involving minimal steps in preparing a foam filled pultruded profile.

SUMMARY OF THE INVENTION

This invention provides a method of forming a pultruded profile substantially filled with a foam material, the profile comprised of a reinforced thermosetting or thermoplastic resin pultruded into a hollow profile having an exterior shape defined by a die and an interior shape provided by a mandrel, and introducing a foam material into the cavity of the pultruded profile through the mandrel.

In the process of the invention, a hollow pultruded profile is first formed. The exterior shape of the profile is defined by a pultrusion die; the interior cavity is defined by the mandrel of that die. The invention makes use of a pultrusion die wherein the mandrel of the die has at least one inlet and outlet that allow a foam forming material to pass through the mandrel and into the cavity of a pultrusion profile formed by the die and mandrel.

BRIEF DESCRIPTION OF THE DRAWINGS

FIG. 6 is an overhead schematic view of an embodiment of a reaction injection molding process which could be used in the present invention.

DETAILED DESCRIPTION OF THE INVENTION

Figure 1:
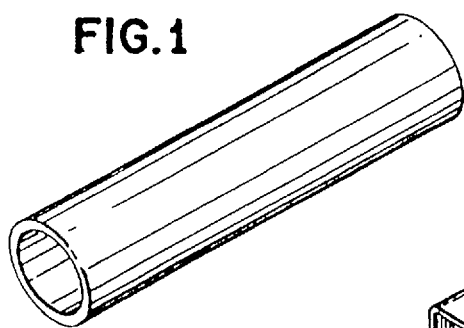
FIG. 1 is a perspective view of a typical hollow pultruded profile.
Figure 2:
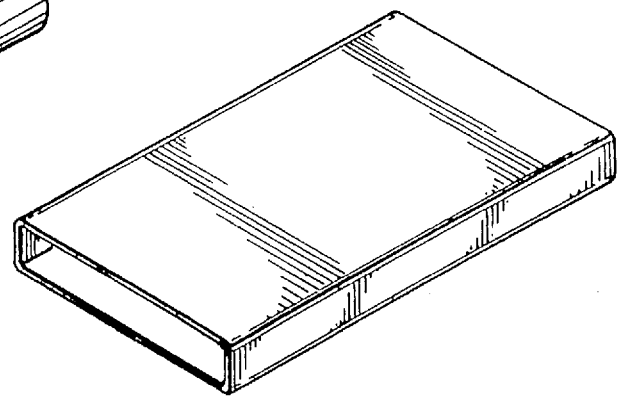
FIG. 2 is a perspective view of a typical hollow pultruded profile.

In the method of the present invention, reinforcing fibers are coated or impregnated with resin material. This may be accomplished in any way known in the art, or by using a combination of methods. FIGS. 1 and 2 illustrate common pultruded profiles with no foam. The type or shape of the profile is immaterial, but rather the process of foaming inline and the resultant article is the critical feature of the invention.

Advantages of the use of the foam filled profiles may be realized in the fenestration industry in situations wherein having a rigid structural member with excellent fastener retention, superior thermal performance, and the ability to make complex shapes is desirable.

Applications not in the fenestration field that may benefit from the advantages of foam filled profiles are foam filled panels for walls in dwellings, garage door sections, and structural beams for buildings.

Figure 3:
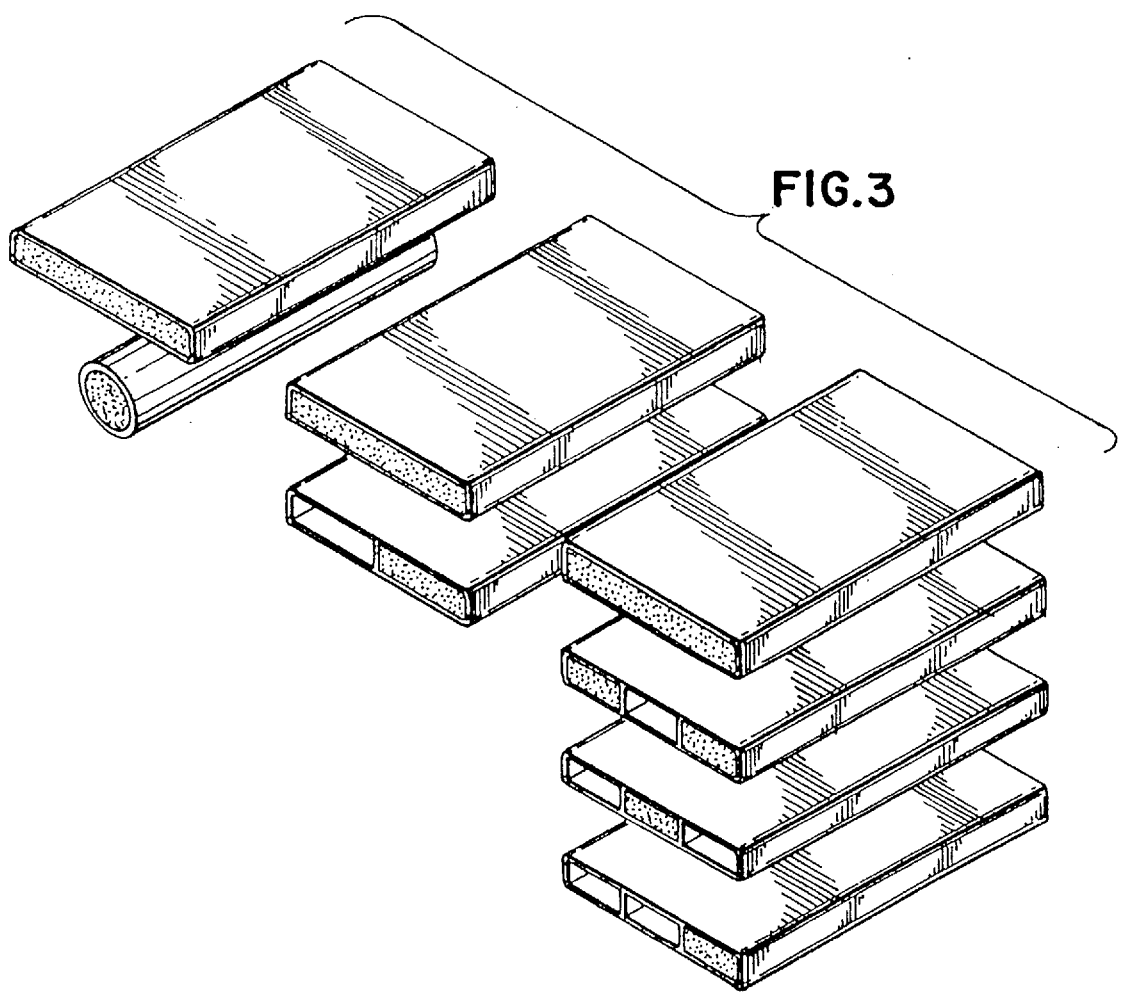
FIG. 3 is a perspective view of several typical profiles showing foamed and empty cavities in profiles according to the present invention.

FIG. 3 shows several variations of hollow profiles that are partially or fully filled with a foam plastic. A basic hollow shape may be filled for increased thermal performance of the product, or a profile with two cavities may be made through the use of a divider wall, either side may be filled with the same, or differing densities of foam material. In some instances, multiple cavity profiles may be necessary for the part to function correctly, and some or all of the cavities may be filled with different types or densities of foam material. An example of this is shown in FIG. 3, with multiple cavities shown in some of the profiles. Foam material may be introduced into some or all of the cavities.

Figure 4:
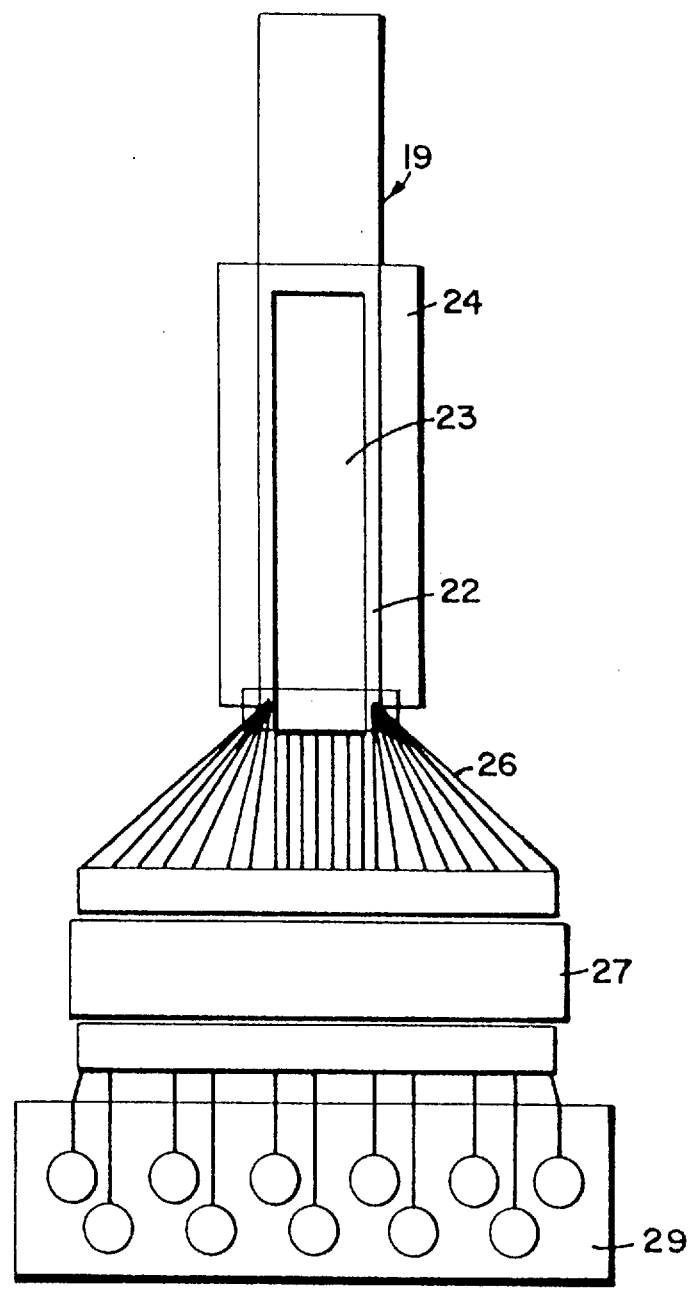
FIG. 4 is an overhead schematic view of a prior art pultrusion process for hollow profiles.
Figure 5:
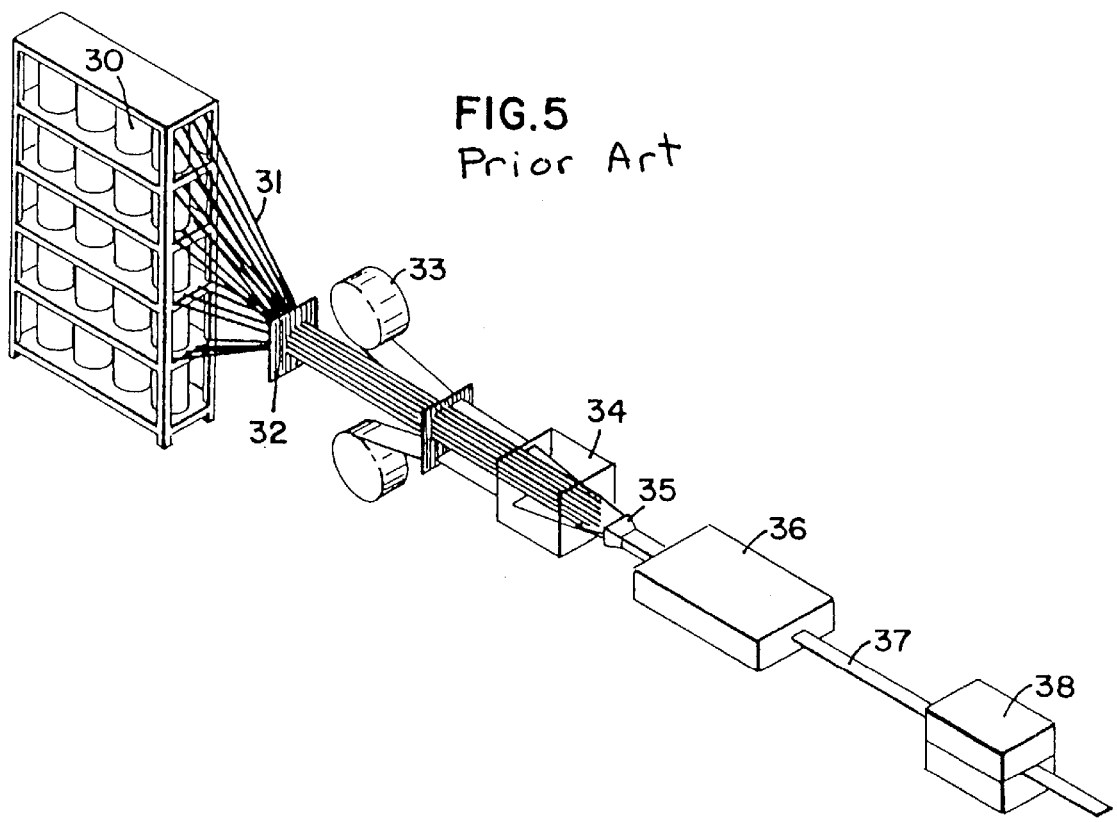
FIG. 5 is a perspective schematic view of a prior art pultrusion process for hollow profiles.

Known methods of pultrusion are shown in FIGS. 4 and 5 and include dipping the fibers into a resin bath, drawing the fibers through a straight-through resin bath, or direct resin injection. The dip bath method is commonly used, and involves dipping the reinforcing fibers down into a resin bath over a series of bars that allow each fiber to be coated or impregnated with the resin material. This could be achieved by running separate lines to each mandrel used in making the particular hollow profile. The fibers then move up from the bath, back into a horizontal path and through a series of guides that begin to shape the wet fibers and also remove any excess resin that may be present.

If the dip bath method is not used, the fibers may be coated or impregnated with resin in a number of other ways, such as the "straight through" method, where the fibers are pulled straight through the resin bath via appropriately sized and aligned end plates, without removing the fibers from their original horizontal plane. The resin can also be directly injected into a forming collar or guide under pressure. The fibers are then coated or impregnated with the resin just before entering the die.

After being impregnated or coated with resin, the reinforcing fibers move through a series of forming guides and into the pultrusion die. The forming guides may be attached to the pultrusion die, to insure that the fibers are properly aligned when entering the die. Forming guides may be made of any abrasion resistant material such as, for example, Teflon (™), ultra high molecular weight polyethylene, chrome plated steel, or ceramic guides.

In one embodiment of the invention, a pultruded profile is formed from a reinforced resin material. The reinforced resin material may be made of a thermoplastic or thermosetting resin reinforced with a material that provides added strength to the finished profile. The resin may also be an exothermic set resin. Generally, the resin used in the formation of the pultruded profiles of the invention may be any thermosetting or thermoplastic resin or mixture of resins. Examples of suitable resins include, but are not limited to, unsaturated polyesters, vinyl esters, polyethylenes, epoxy resins, polyacrylates, and the like. Generally, any resin or material which is capable of creating a cavernous profile may be used in the present invention.

The resins may also contain additives such as fillers, mold releases, slip agents, colorants, and so on.

The reinforcing material may be selected from a wide variety of materials. Glass fibers are commonly used due to their wide availability and good strength characteristics. However, a number of useful reinforcing materials are available for use in the preparation of pultruded profiles, and any reinforcing material useful in the preparation of pultruded profiles may be used in the process of the invention. Useful classes of reinforcing materials include, along with glass fibers, aramid fibers, carbon fibers, thermoplastic fibers, and fiberglass. Combinations of these materials may also be used, if desired. The reinforcing material may be in any suitable form, including, but not limited to, rovings, mats, veils, braids, or combinations thereof.

The hollow pultruded profile comprising a reinforced thermosetting resin is prepared by coating the reinforcing material with the resin material, then pulling the coated fibers into the pultrusion die. After the profile is formed and has substantially cured, a foam forming material is injected through the mandrel of the pultrusion die into the hollow shape, thereby substantially filling an internal cavity of the profile. The injection of the foam material may be introduced prior to full curing, with the only requirement being the profile is substantially cured such that the introduction of the foam material does not result in undesirable reshaping of the profile. Substantially cured, when used in this application, refers to the material state of the profile wherein the profile possesses physical properties (i.e. modulus of elasticity and elongation) that are at least 75% of the value obtained when the profile is fully cured. The foam material may be mixed prior to injection through the mandrel or may be fed with lines to a mixing chamber at the end of the mandrel. The mixing and expansion chamber at the end of the mandrel shall have walls consisting of the walls defining the cavity of the pultruded profile, the end of the mandrel and previously injected foam material being substantially cured. The density of the foam material can be altered by choice of foam material, profile pultrusion rate and foam injection rate. The foam material cures in the cavity of the pultruded profile, either within or directly after the die, and may bond both mechanically and/or chemically to the inside walls of the pultrusion cavity. The foam material may be injected in batches or continuously, with the rate determined by the density of foam material desired and the rate of pultrusion.

As used herein, "foam", "foam forming material" or "foam material" refers to any material that forms a foam material. The density of the foam material and the pressure exerted by the formation of the foam material should be sufficiently low such that the shape of the pultruded profile is not distorted by the foaming action. Useful foam forming materials include reaction injected foam materials such as those having a polyurethane active site, or any other suitable foaming material. Possible other foam materials include, but are not limited to, polystyrene and phenolic resins. Preferably, the foam material is a foam, however, broadly, it encompasses any liquid which could be injected into the cavity and cures thereafter.

The cavity may be partially or substantially filled with foam material. The internal cavity of the pultruded profile of the invention is considered to be substantially filled when about 80% to 100% of the internal volume of the profile is filled with the foam material, with the internal volume not including any natural porosity of the foam material. Preferably, the pultruded profile is 95% to 100% filled with the foam material. However, only some of the cavities within a profile may be filled as shown in FIG. 3. This provides a pultruded article with excellent strength, modulus and screw retention, among other things.

A typical pultrusion system is represented in FIGS. 4 and 5. This setup might be used to manufacture the profiles depicted in FIGS. 1 and 2. In FIG. 4, the pultrusion cross section 19 may be produced and maintained on the external side by a pultrusion die 24 and on the interior of the hollow profile 19 by a pultrusion mandrel 23. The mandrel 23 is secured at the inlet of the pultrusion die 24 so that it does not travel with the pultrusion profile 19. The profile 19 may consist of a number of different mats, veils, braids, rovings and resins. The rovings are stored in wrapped creels and the creels stored on a creel holder 29. The rovings are directed in an orderly manner through a roving guide to be impregnated in the resin bath 27. The impregnated rovings 26 are then guided into the pultrusion die 24 where added heat initiates a reaction in the resin to form the profile 19. The liquid is heated to a gel like state in region 22 where it conforms to the walls of the mandrel 23 and the die 24. The heated material cures exothermically into a shape that conforms to the walls of the die 24 and mandrel 23.

FIG. 5 shows an isometric view of a pultrusion process that uses a series of rovings and mats or veils to produce a hollow profile through a die and mandrel arrangement. The rovings 31, are pulled from a set of roving creels 30, through a roving guide plate 32. Mats or veils are dispensed over the top of the roving with a mat or veil dispensing roll 33. The combined profile reinforcement system is sent through another guide plate assortment that directs the reinforcements into the resin impregnator 34. The resin impregnator 34 allows the reinforcing materials to be surrounded by the resin material. The system is pulled into the preformer 35 where excess resin and air is squeezed out and the shape of the profile has begun to form. The forming and curing die 36 provides a constant cross section profile and heats the material to an elevated temperature to initiate a cross linking reaction. The time required for the material to crosslink depends upon resin types, heat added by the die 36, and the cross section used. The profile 37 is substantially cured by the time the profile 37 exits the die 36. The pulling mechanism 38 provides the motive force for the material to move through the die 36.

FIG. 6 shows a reaction injection molded scheme which could be used in the present invention. This process would provide the foam material inline into the profile cavity. The process shown relates to a two part foam material mixture such as those found in the production of thermoset urethane foams. The components that are to be mixed are isolated and held in storage tanks 14 and supplied to the inlet of the pressure supply pumps 12, to the flow directing valve block 16. At the flow directing valve 16, material is either diverted back to the storage tanks 14 or ported into the mold 18. Material that is diverted back to the tanks 14 is directed through coolers 15 that are supplied with cooling water 13. If the gating in block 16 is opened, the block 16 ports fluid from the supply pumps 12 to a mixing head 17. The mixing head 17 typically consists of counter flow spray nozzles to provide intimate contact between the component materials. The mixed material is ported directly into the mold 18 where the material cross links and expands to fill the mold 18 completely. In the article made by the invention, the walls of the mold shall consist of the walls defining the cavity of the pultruded profile, the end of the mandrel and previously injected foam material being substantially cured. The density of the reaction injection molded material is defined by the type of material and the flow rate of the reaction injection molded material, and the internal cross section and speed of the pultrusion profile.

Figure 8:
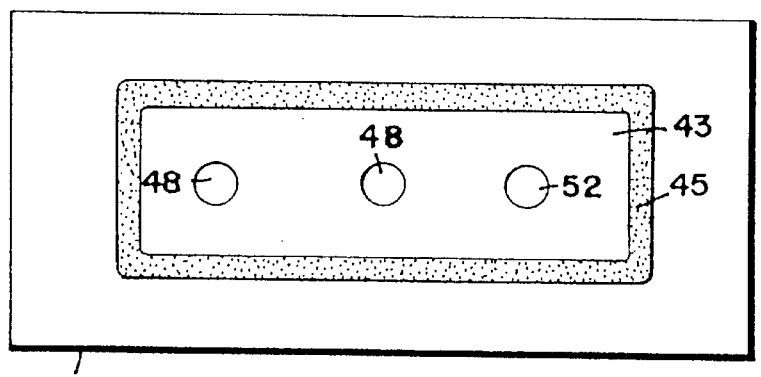
FIG. 8 is a cross-sectional view of FIG. 7 through the plane 8—8, viewed from the exit side of FIG. 7, showing the pultruded profile and mandrel with foam and vent openings.
Figure 7:
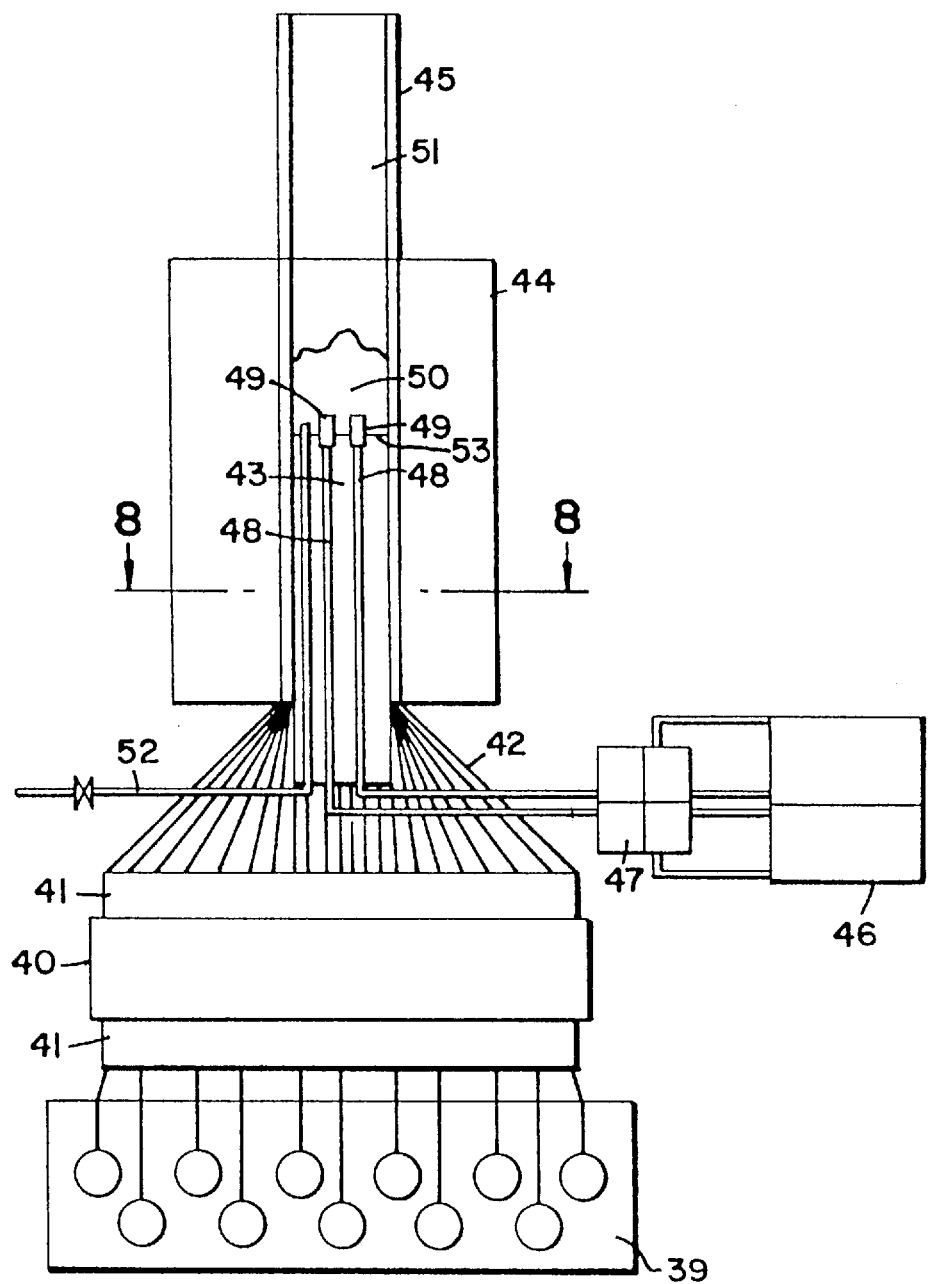
FIG. 7 is an overhead schematic view of an embodiment of the present invention.

The preferred embodiment of the method of the present invention is depicted in FIGS. 7 and 8. Generally, the roving and mat dispensing system 39 allows reinforcing materials to be pulled though a series of roving guides 41 and the resin bath 40. The impregnated rovings 42 are directed into the pultrusion die 44 and around the mandrel 43. Because the invention is directed to the production of hollow pultruded profiles filled with foam material, the die 44 must be fitted with a mandrel 43 to define the interior cavity of the pultruded profile 45. The mandrel 43 may be supported in a cantilever manner throughout the length of the die 44, such that it resists the forward force of the material being pulled around and over the mandrel 43. The heat from the die 44 allows the resin to cure into the hollow pultrusion profile 45. The pultrusion profile 45 is formed by the pultrusion die 44 on the outside surfaces and the mandrel 43 on the inner surfaces.

The foam material is preferably produced by a system as depicted in FIG. 7, and is modified to be fed into the pultrusion process. The reaction injection molding system resin is pumped from the tanks 46 to the pumping and flow directing system 47. The material is directed into the pultrusion process via lines 48 to the exit side of the die 44 through the mandrel 43. Mixing heads 49 on the tip of the mandrel 43 direct the foam materials into each other for adequate mixing. The mixed materials 50 foam as they react to expand to the volume of the internal cavity of the profile 45. The foam material 50 is contained by the cured foam material 51 ahead of it, the cavity walls of the pultrusion profile 45 and the mandrel 43 behind it. Vent line 52 is provided for startup and shutdown operations and to maintain proper pressures inside the chamber.

A proper control system to adjust rates of the different processes is also contemplated. It is envisioned that numerous parameters would be measured and monitored to ensure proper foam material mixing and to ensure the profile is substantially cured prior to foam material introduction.

FIG. 8 shows a cross section of FIG. 7 taken along line 8—8, through the die 44 and mandrel 43. The reinforced resin system is pulled between the pultrusion die 44 and the pultrusion mandrel 43. After the pultrusion profile 45 has significantly cured, the foam material is introduced via a single or multiple lines 48. The foam material flows through the mixing head and is allowed to foam inside the cavity of the pultrusion. A port for venting 52 is valved to allow for control of pressure inside the chamber by venting of gases out of or air into the pultrusion inner cavity. Multiple cavity pultrusion profiles may use more than one mandrel with different types and densities of foam material applied to each cavity depending on the strength requirement of the pultrusion.

The pultrusion die 44 is heated to provide sufficient heat to the resin to allow it to cure and/or set. The die 44 can be heated in a number of different ways, such as by strip or cartridge heaters, heating jackets, or heating plates, depending on the particular arrangement of the apparatus. The temperature must be carefully controlled to ensure proper curing of the resin; too little heat can result in an incomplete cure, while too high a temperature can result in cracking or other undesirable properties. The temperature within the pultrusion die typically ranges from about 70° C. to 200° C. The resin cures and solidifies in the pultrusion die 44, providing a pultruded profile 45 with a hollow cavity.

The foam material is pumped through tubes 48 that may be insulated as they pass through the mandrel 43 of the die 44, to protect the foam material from premature exposure to heat. This insulation may be accomplished by the use of double wall tubing with spacers or any means of thermally isolating a pressurized supply line. The mixing heads 49 are attached to the ends of the tubes 48 and the mandrel 43. The end or tip of mandrel 43 is designated as 53. If a two part foam material is used, the mixing heads are aligned such that the two parts mix as they are injected into the cavity of the hollow profile. The foam material cures in the cavity of the substantially cured pultruded profile, either within or after the pultrusion die. As the foam material cures it bonds to the inside walls of the pultruded profile, providing additional strength and stability to the profile.

In certain circumstances, it may be necessary to maintain external pressure on the lineal profile shape so that the internal pressure due to formation of the foam does not deform the shape of the profile. This situation may exist with certain formulations of resin and foam materials, or during high processing line speeds, or due to external factors that are not controlled by the process. In these situations, wheels, low friction skid plates, shaped rollers or other means may be used to maintain external pressure on the profile. This pressure would be maintained until the internal foam material becomes sufficiently cured or the external profile becomes sufficiently cured to maintain the profile shape. The rollers or skid plates or wheels are normally situated at the outlet of the pultrusion die and are adjustable with respect to position and force applied. The exterior shape of the pultrusion profile is defined by the pultrusion die. The versatility of the pultrusion process allows for the production of nearly any desired cross-sectional profile. Preferable profiles envisioned for this invention include window and door frame and/or sash lineals and foam filled wall panels. However, any industry or application needing a foamed profile would benefit from the present invention.

Therefore, it may be seen that the invention offers several advantages over the prior art. As one skilled in the art would appreciate that various modifications could be made to the invention without departing from the spirit and scope of the invention, the invention thus resides in the claims hereafter appended.

We claim:

1. A method of forming a composite profile having an internal volume substantially filled with a foam material, the method comprising the following steps:

(a) pultruding a resin into a hollow profile having an exterior shape defined by a die and an interior cavity defined by a mandrel;

(b) substantially solidifying the profile such that the modulus of elasticity of the profile is from 75% to 100% of the modulus of elasticity that the profile has when completely solidified; and (c) introducing a foam into the cavity through the mandrel after substantially solidifying the profile.

2. The method of claim 1 wherein the resin is a thermoplastic resin.

3. The method of claim 1 wherein the resin is a thermoset resin.

4. The method of claim 1 wherein the foam is selected from the group consisting of polyurethane, polystyrene, and phenolic foams and mixtures thereof.

5. The method of claim 1 wherein the foam is injected into the cavity prior to the profile being fully cured.

6. The method of claim 1 wherein the foam is introduced as a two part system into the cavity.

7. The method of claim 1 wherein the foam is introduced as a mixed system into the cavity.

8. The method of claim 1 wherein the foam is introduced within the pultrusion die.

9. The method of claim 1 wherein the foam is introduced after the profile exits the pultrusion die.

10. The method of claim 1 wherein the resin of the hollow profile is selected from the group consisting of a polyethylene resin, a polyester resin, a vinyl ester resin, an epoxy resin, an unsaturated polyester resin composition in combination with a reinforcing component, a vinyl ester resin composition in combination with a reinforcing component, and an epoxy resin composition in combination with a reinforcing component, and combinations thereof.

11. The method of claim 1 wherein the profile is reinforced with a reinforcing component selected from the group consisting of fiberglass, glass fiber, aramid fiber, carbon fiber, a thermoplastic fiber, and combinations thereof.

12. The method of claim 1 wherein the profile is reinforced with a reinforcing component in the form of rovings, mats, veils, braids, and combinations thereof.

13. The method of claim 1, further comprising maintaining external pressure on the profile as the foam is introduced in the cavity so as to maintain the exterior shape of the profile.

* * * * *